US004001597B2

United States Statutory Invention Registration [19]

[11] Reg. Number: H1597

[45] Published: Sep. 3, 1996

Erickson

[54] EPOXIDIZED DIENE ELASTOMERS FOR EXTERIOR BLOCK CROSSLINKING

[75] Inventor: James R. Erickson, Katy, Tex.

[73] Assignee: Shell Oil Company, Houston, Tex.

[21] Appl. No.: 423,431

[22] Filed: Apr. 18, 1995

Related U.S. Application Data

[62] Division of Ser. No. 863,579, Apr. 3, 1992.

[51] Int. Cl.[6] ..... C08J 3/28

[52] U.S. Cl. ..... 522/158; 525/314; 525/901

[58] Field of Search ..... 525/314, 901

[56] References Cited

U.S. PATENT DOCUMENTS 3,607,982 9/1971 Winkler et al. .

4,417,029 11/1983 Milkovich .

5,002,676 3/1991 Willis et al. ..... 252/56 R

*Primary Examiner*—Charles T. Jordan

*Assistant Examiner*—J. R. Hardee

[57] ABSTRACT

An epoxidized diene block polymer comprising at least interior and exterior diene blocks wherein the exterior diene blocks contain a greater concentration of di-, tri- and tetra-substituted olefinic epoxides than the interior blocks and wherein the exterior blocks contain from 0.2 to 10 Meq of olefinic epoxides per gram of exterior blocks and the molecular weights of the exterior blocks are from 3000 to 50,000 and the molecular weights of the interior blocks are from 15,000 to 200,000.

2 Claims, No Drawings

EPOXIDIZED DIENE ELASTOMERS FOR EXTERIOR BLOCK CROSSLINKING

This is a division, of application Ser. No. 07/863,579, filed Apr. 3, 1992.

BACKGROUND OF THE INVENTION

This invention relates to epoxidized diene block elastomers suitable for endblock crosslinking and adhesive compositions made therefrom.

Curing of adhesives based on conjugated diolefins and, optionally, vinyl aromatics has increased the range of service properties for such adhesives. Radiation curing and chemical curing of polymers to make such adhesives is known. This curing causes covalent crosslinking of the polymerized conjugated diolefins which is evidenced by a high gel content of the crosslinked polymer. Before crosslinking, the polymers are melt processable but after crosslinking, the gel cannot be processed as melts. Crosslinking therefore enhances solvent resistance and improves elevated temperature shear properties. Compositions can therefore be applied to a substrate in a melt and then crosslinked to form a superior adhesive. However, improvements in the adhesives could be made if the adhesives could be cured at lower dosages of radiation, provide longer term heat resistance, or provide improved weatherability.

Further, the known curable adhesives which are based on vinyl aromatics and conjugated diolefins do not have particularly good long term heat, weather and ultraviolet stability due to the need to utilize unhydrogenated polymers. The known-vinyl aromatic-conjugated diolefin based adhesives which are curable are unhydrogenated polymers. Hydrogenation is known to improve long term heat, weather and ultraviolet stability, but it removes the double bonds which are needed to effect the curing by radiation crosslinking. Such curing methods are not effective when the polymers are hydrogenated. The requirement for this unsaturation is particularly evident when typical tackifiers are present in the compositions because their presence generally inhibits crosslinking of the polymer.

It is an object of the present invention to provide an epoxidized copolymer which may be crosslinked, preferably by radiation, which is melt processable before crosslinking but has a high gel content after crosslinking. Further, it is an object of this invention to provide an adhesive composition which is based on this crosslinkable block copolymer.

SUMMARY OF THE INVENTION

The present invention comprises elastomeric block copolymers, based on at least one conjugated diolefin monomer, that contain a greater concentration of di-, or tri-, or tetrasubstituted olefinic epoxides in the exterior blocks, and lesser concentration in the interior blocks of the polymer. The polymers of the invention may or may not be hydrogenated and if they are hydrogenated, the hydrogenation may take place either before or after epoxidation. The polymers may be crosslinked through at least some of the epoxy functionality, preferably by radiation, and can be used to make rapid curing and heat stable adhesives, sealants, coatings, used as additives to modify asphalt, flexible printing plates, fibers, and films, and also as modifiers for polyesters and polyamides.

The exterior A blocks.contain a greater concentration of di-, tri-, or tetrasubstituted olefinic epoxides (1,1-disubstituted, 1,2-disubstituted, 1,1,2-trisubstituted, and 1,1,2,2-tetrasubstituted olefinic epoxides) than the interior B blocks. The A blocks contain such epoxides within the concentration range of 0.2 to 10 milliequivalents (Meq) per gram of block A, preferably within the range of 0.5 to 8 Meq/g, and most preferably within the range of 1 to 5 Meq/g. Preferably, the ratio of the concentration (Meq/g) of such epoxide groups bonds in A to the concentration in B should be at least 3:1, more preferably, the ratio should be greater than 5:1.

The molecular weight of the A blocks is above 3,000 and not higher than 50,000, preferably between 3,000 and 25,000, most preferably between 3,000 and 15,000. The molecular weight of the B blocks is above 15,000 and not greater than 200,000, preferably between 15,000 and 100,000, most preferably between 15,000 and 50,000.

DETAILED DESCRIPTION OF THE INVENTION

The general methods of making block copolymers are reviewed by R. P. Quirk and J. Kim, "Recent Advances in Thermoplastic Elastomer Synthesis," Rubber Chemistry and Technology, volume 64 No. 3 (1991), which is incorporated herein by reference. Especially useful is the method of sequential anionic polymerization of monomers. The types of monomers that will undergo living polymerization are relatively limited for the anionic method, with the most favorable being conjugated diolefins and monoalkenyl aromatic hydrocarbon monomers. Generally, a hydrogenation step is needed to prepare a saturated polymer. Hence, a polymer of this invention that is both epoxidized and saturated usually requires both an epoxidation and a hydrogenation step. However, polymers made by sequential polymerization of a suitable diolefin monomer and a monomer having only one carbon-carbon double bond or by sequential polymerization of two different mixtures (ratios) of such monomers, using either a monofunctional initiator, a monofunctional initiator and a coupling agent, or a multifunctional initiator, may be epoxidized and would not have to be hydrogenated to produce an epoxidized polymer of this invention that is saturated.

The polymers containing olefinic unsaturation or both aromatic and olefinic unsaturation may be prepared using anionic initiators or polymerization catalysts. Such polymers may be prepared using bulk, solution or emulsion techniques. Polymers prepared in solution are preferred for subsequent epoxidation and hydrogenation.

A very useful embodiment of this invention may be conveniently prepared by anionic polymerization, preparing blocks A and B, (optionally M and C, discussed below), each consisting of homopolymers or copolymers of conjugated diene monomers or copolymers of conjugated diene monomers and alkyl aryl monomers wherein the monomers used for the A blocks are such that the A blocks have a greater average number of highly substituted residual olefinic double bonds per unit of block mass than do the B blocks. Since the desired final polymer is to be elastomeric, it is necessary that the amount of the alkyl aryl monomers in the interior B blocks does not exceed 50% by weight. The amount of alkyl aryl monomers copolymerized in the A blocks can be greater, up to 99%, provided that enough conjugated diene monomer is used to assure the presence of a sufficient level of higher substituted olefinic double bonds in A for epoxidation.

The polymer is epoxidized under conditions that enhance the epoxidation of the more highly substituted olefinic double bonds, such as by the use of peracetic acid, wherein the rate of epoxidation is generally greater the greater the degree of substitution of the olefinic double bond (rate of epoxidation: tetrasubstituted> trisubstituted> disubstituted>monosubstituted olefinic double bond). Sufficient epoxidation is done to achieve the desired level of epoxidation in the A blocks (within the range of 0.2 to 10 Meq/g). $^1$H NMR can be used to determine the loss of each type of double bond and the appearance of epoxide.

If a substantially saturated polymer is desired, the epoxidized polymer is hydrogenated to remove substantially all remaining olefinic double bonds (ODB) and normally leaving substantially all of the aromatic double bonds. If only substantially saturated interior blocks are desired, the epoxidized polymer may be partially hydrogenated in a selective manner with a suitable catalyst and conditions (like those in Re. 27,145, U.S. Pat. No. 4,001,199 or with a titanium catalyst such as is disclosed in U.S. Pat. No. 5,039,755, all of which are incorporated by reference; or by fixed bed hydrogenation) that favor the hydrogenation of the less substituted olefinic double bonds (rate or hydrogenation: monosubstituted> disubstituted> trisubstituted>tetrasubstituted olefinic double bonds) and also leaves aromatic double bonds intact, so as to saturate the B blocks and leave some or all of the unsaturation intact.in the A blocks and/or any portions of the optional M block or the C arms that may also contain unepoxidized higher substituted olefinic double bonds.

Alternatively, selective partial hydrogenation of the polymer may be carried out before epoxidation such that between 0.2 and 11.6 Meq of olefinic double bonds are left intact, as required of an A block for subsequent epoxidation. Fully epoxidizing 11.6 Meq of ODB per gram of polymer gives 10.0 Meq of epoxide per gram of the final polymer because of a 16% weight gain due to the added oxygen. If selective partial hydrogenation is done first, the epoxidation does not need to be selective with respect to the degree of substitution on the olefinic double bonds, since the objective is usually to epoxidize as many of the remaining ODB's as possible. After hydrogenation, it is preferred that the ratio of ODB's in the A blocks to that in the B blocks be at least 3:1.

Generally, if a hydrogenation step is used, sufficient improvement of the polymer's chemical and heat stability should be achieved to justify the extra expense and effort involved, and this generally means at least saturating the interior blocks B to the point that they have less than 1 Meq of olefinic double bonds per gram of B left intact. For greatest heat stability, all of the olefinic double bonds, anyplace in the polymer, that are not epoxidized should be removed so that less than 1 Meq of ODB per gram of polymer remain, more preferably less than 0.6 Meq/g, and most preferably less than about 0.3 Meq/g of polymer.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include isoprene (2-methyl-1,3-butadiene), 2-ethyl-1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl- 1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are 1,3-butadiene, piperylene, 4,5-diethyl-1,3-octadiene and the like. Di-substituted conjugated diolefins which may be used include 2,3-dialkyl-substituted conjugated diolefins such as 2,3-dimethyl- 1,3-butadiene, 2,3-diethyl-1,3-pentadiene, 2,3-dimethyl-1,3-hexadiene, 2,3-diethyl-1,3-heoptadiene, 2,3-dimethyl-1,3-octadiene and the like and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro- 1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Conjugated dienes can also be copolymerized with methacrylates, such as t-butyl methacrylate, as described in U.S. Pat. No. 5,002,676, which is incorporated herein by reference, and such copolymers can be epoxidized and hydrogenated as described herein. The preferred use position in the polymer for methacrylates, when used, is in the C arms.

There are a wide variety of coupling agents or initiators that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972; 3,135,716; 3,078,254; 4,096,203 and 3,594,452 which are herein incorporated by reference. When the coupling agent has two reactive sites such as dibromoethane, the polymer will have a linear A-B-A structure. When the coupling agent has three or more reactive sites, such as silicon tetrachloride, the polymer will have a branched structure, such as $(A\text{-}B)_n\text{-}X$. Coupling monomers are coupling agents where several monomer units are necessary for every chain end to be coupled. Divinylbenzene is the most commonly used coupling monomer and results in star polymers.

In general, any of the solvents known in the prior art to be useful in the preparation of such polymers may be used. Suitable solvents, then, including straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetraline, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyt lithium initiator. The living polymer chains are usually coupled by addition of divinyl monomer to form a star polymer. Addition monomers may or may not be added to grow more arms, C arms, or to terminally functionalize, such as with ethylene oxide or carbon dioxide to give hydroxyl or carboxyl groups, respectively, and the polymer and the living chain ends are quenched with a proton source such as methanol or hydrogen. Polymerization may also be initiated from monomers such as m-divinylbenzene and m-diisopropenylbenzene treated with butyl lithium.

The block copolymers can be either linear polymers of the basic formula, A-B-A, and its simple variations, $(A\text{-}B)_k$ and $A\text{-}(B\text{-}A)_j$, or symmetric and asymmetric star (centrally branched) polymers of the basic formula $(A\text{-}B\text{-}M_p)_n\text{-}X\text{-}C_r$, and its simple variations, $((A\text{-}B)_j\text{-}M_p)_n\text{-}X\text{-}C_r$ and $(A\text{-}(B\text{-}A)_j\text{-}M_p)_n\text{-}X\text{-}C_r$, wherein A is the exterior block, B is the interior block, M is an optional miniblock, and C is an optional arm (branch) consisting of one or more blocks. The $A\text{-}B\text{-}M_p$ arms (branches) and their simple variations are referred to as D arms when it is convenient to do so. The blocks themselves may be homopolymer or copolymer blocks including tapered blocks. The star structures are preferred over the linear structures. Also preferred are nonrepetitive A-B diblock segments (where there is no subscript j in the formula).

M is a miniblock of monomer that can be used to affect the number or stability of the arms coupled or originating at X. The molecular weight of M is greater than 50 and less than 3000, preferably less than 1000. M is a vinyl aromatic hydrocarbon or a diene, typically oligostyrene or oligoisoprene. For instance, when coupling anionically prepared $A\text{-}B^-$ living arms, where A is polyisoprene and B is polybutadiene, with commercial DVB-55 the degree of coupling to make the star is often less than 80%, with greater than 20% of the arms remaining unattached to the main star mode in the final product. The exact amount left unattached is very dependent upon the exact conditions of the coupling reaction, such as the amount of ether cosolvent used, the time elapsed after polymerization of the A-B arms and the temperature of the polymer solution during the DVB-55 addition. In contrast, when a small miniblock of oligoisoprene is incorporated to make the A-B-M arm, the coupling reaction is less sensitive to reaction conditions and degrees of coupling above 80 or 90% are typically achieved. Further, presence of the miniblock can be additionally beneficial when the polymer is being used under harsh service conditions, such as high temperature use, because a completely saturated block like oligostyrene or an epoxidized oligoisoprene can prevent scission of the arm from the star at the core of the star.

X sits at the junction point or region in the polymer molecule at which the arms (branches) of the polymer connect and represents the agent or agents that function as the connector. Generally X either represents coupling agents or monomers that cause the majority of the arms to join together after polymerization of the arms, or represents an initiator with an active functionality of 3 or greater from which polymerization of the arms takes place.

Asymmetric star polymers, by definition, require the use of the optional C arms, which are necessarily different than the D arms. C arms are block or multiblock segments that are usually prepared from one or more of the monomers used to prepare the D .arms. The molecular weight of a C arm is between about 50 and 100,000, preferably between about 500 and 50,000. The linear size of arms of greater length gives polymers with extremely high hot melt application viscosities. Care must be exercised that the combination C monomer selection, number of C arms or volume fraction of the C arms in the polymer does not change the overall nature of the polymer from one that is essentially elastomeric and primarily epoxidized (and curable) in exterior blocks to one that is not elastomeric. Sometimes it is useful to prepare C from monomers other than those used in A or B. For instance, a methacrylate monomer, such as t-butyl methacrylate, can be added to a DVB-coupled star prior to termination and the arms C can be grown out from the living DVB core of the star.

The subscripts are integers that indicate how many times a particular block or arm is present on a particular polymer. The subscript p is 0 or 1, n and r are integers where $n \geqq 2$, $r \geqq 0$, and n+r is the total number of arms and ranges from 3 to 100, preferably from 5 to 50, and most preferably from 10 to 40. When p equals 0 or r equals 0 there is no miniblock M or no C arms. Preferably $n \geqq r$, and most preferably r=0.

The subscript k is 2 to 6 and j is an integer from 1 to 6. Larger values of j produce polymers that have very large linear size which yields polymers with extremely high hot melt application viscosities. Even when the subscript j is only in the range of 2 to 6, it is important that the molecular weights of the A and especially the B blocks are near the lower end of permissible values.

The total number of arms, n+r, and range from 3 to about 100, preferably from about 10 to 40. As the number of arms increases, so does the average molecular weight of the polymer, which substantially increases the polymers ability to cure easily, such as with very low dose radiation, because the number of cure sites (epoxide sites) increases in proportion to the molecular weight at any fixed concentration of epoxide in the polymer. Fortunately, the substantially increased polymer tool ecul ar weight causes very little increase in melt viscosity because of the compact nature of a star polymer. However, trying to attain the highest possible number of arms on a star polymer often results in the formation of some gel during the manufacture of the polymer, which makes subsequent processing and filtering of the polymer during manufacture, light scattering analysis for molecular weight, or application of the polymer difficult or impossible. This is why the most preferred upper bound for the number of arms is 40.

A special case is where A is a polyisoprene block polymerized under conditions that yields primarily 1,4-polyisoprene, for which the residual double bonds are trisubstituted, and B is a polybutadiene block for which all of the residual double bonds are mono- or disubstituted. Another special case is where the A block is a random polyisoprene/polystyrene copolymer in which a majority of the polyisoprene is 1,4-polyisoprene and the B block is polybutadiene. Either epoxidation alone, epoxidation first followed by hydrogenation, or partial hydrogenation of these polymers first followed by epoxidation, works extremely well. When B is polybutadiene, it often is convenient to use a miniblock M where M is oligoisoprene or oligostyrene, when making star polymers. The polymer can be epoxidized to provide a level of epoxidation between 0.2 to 10 milliequivalents of epoxy per gram of A, while the B blocks will contain a lesser amount of epoxidation than A.

Another special case is the sequential polymerization of a single conjugated diene monomer under two sets of reaction conditions. An example is the anionic polymerization of 1,3-butadiene in cyclohexane to produce primarily 1,4-polybutadiene followed by addition of a microstructure modifier, such as an ether cosolvent, and polymerization of high 1,2-polybutadiene, followed by coupling and selective epoxidation to give an A-B-A or an $(A\text{-}B\text{-}M_o)_n\text{-}X\text{-}C_o$ polymer of this invention. A is 1,4-polybutadiene with disubstituted double bonds and B is 1,2-polybutadiene which has only monosubstituted double bonds. The polymer can be subsequently hydrogenated to remove substantially all of the remaining olefinic double bonds if a saturated polymer with maximum long term heat resistance is desired. Here again, partial hydrogenation can be practiced first. However, it is better to epoxidize first since it is easier to very selectively epoxidize the 1,2-disubstituted double bonds of the 1,4-butadiene over the monosubstituted double bonds of the 1,2-polybutadiene than it is to selectively hydrogenate the 1,2-polybutadiene over the 1,4-polybutadiene. Obviously, this principle can be applied to the polymerization of other conjugated diene monomers, such as 1,3-isoprene, that can be polymerized to different microstructures which differ in the level of substitution about the double bonds by a deliberate change in reaction conditions.

The following are illustrative examples of polymers encompassed by the above nomenclature. A linear triblock copolymer made by sequential polymerization of the A block monomer(s), the B block monomer(s), and then the A block monomer(s) again is described as an A-B-A polymer. The polymer made using a diinitiator in which the B block monomer is polymerized in two directions, followed by the A block monomer, is also simply described by the nomenclature A-B-A. Likewise, the polymer made by coupling two $A\text{-}B^-$ arms with a difunctional coupling agent to form the linear molecule is an A-B-A polymer. Normally, no A-B-A polymer is an entirely pure triblock polymer. Each synthetic method leaves some degree of an intermediate structure due to dieout or some diblock due to incomplete coupling. A $(A\text{-}B\text{-}M_o)_{15}\text{-}X\text{-}C_o$ is a symmetric star polymer having 15 arms all of which are A-B diblock arms. The zero subscripts on M and C mean that these are not present. The present $(A\text{-}B\text{-}M_o)_{15}\text{-}X\text{-}C_o$ nomenclature is equivalent to $(A\text{-}B)_{15}\text{-}X$, a nomenclature commonly used for a symmetric star polymer. Star polymers are normally made by a coupling reaction using divinyl monomer such as divinylbenzene. Like any coupling reaction, it does not go to 100% completion and some diblock polymer (unattached arms) will be present. The value of n, which in the present example is 15, is determined after the polymer is made. The best way to assign the n values is to measure the weight average molecular weight of the polymer by light scattering as described below, including pure star and diblock components, subtract from it the portion of the mass due to the coupling monomer and then divide this corrected weight average molecular weight by the molecular weight of the arm which is usually the peak molecular weight determined by GPC as described below.

$(A\text{-}B\text{-}M_o)_{15}\text{-}X\text{-}C_5$ where C is identical to a B block, is an asymmetrical star block copolymer. Such a polymer can be conveniently made by initiating with alkyl lithium .and polymerizing the A blocks and then adding 33% more lithium to the reactor prior to adding the B block monomer. Living A-B and B blocks will result that can be coupled with the appropriate agent such as DVB-55 (a divinyl benzene product from Dow). A statistical distribution of species will be made by this process and will have the average $(A\text{-}B)_{15}\text{-}X\text{-}B_5$ composition. $(A\text{-}B\text{-}M_1)_{20}\text{-}X\text{-}C_{20}$ polymer is an asymmetrical star block copolymer prepared by coupling 20 A-B-M triblocks with a small number of coupling monomers, such as DVB, and then adding the polymerizing C block monomer onto the active sites on X before quenching the living system with a proton source.

As stated above, the molecular weight of A is above 3,000 and no greater than 50,000, preferably between about 3,000 and about 25,000, and most preferably between 3,000 and 15,000. The molecular weight of B is above about 15,000 and no greater than 200,000, preferably between about 15,000 and about 100,000, and most preferably between 15,000 and 50,000. The reason for these ranges and preferred ranges are that lower molecular weight blocks make the polymers more difficult to crosslink at low dose of radiation, while higher molecular weight blocks make the polymers very difficult to apply to a substrate by melt or other means. The most preferred ranges balance the crosslinking and application requirements the best for a hot melt system.

Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley & Sons, New York, N.Y., 1979.
2. *Light Scattering from Polymer Solutions*, M. B. Huglin, ed., Academic Press, New York, N.Y. 1972.

3. W. Kay and A. J. Havlik, *Applied Optics*, 12, 541 (1973).
4. M. L. McConnell, *American Laboratory*, 63, May, 1978.

Upon epoxidation, the exterior A blocks have a greater concentration of such di-, tri-, and tetrasubstituted olefinic epoxide than the interior B blocks. Specifically, the Meq of such epoxide per gram of the A blocks will be from 0.2 Meq/g to 10 Meq/g, preferably from 0.5 to 8 Meq/g and most preferably 1 to 5 Meq/g. The ratio of the concentration of such epoxide in the A blocks to that of the B blocks will be at least 3:1 and preferably greater than 5:1. If there were greater epoxidation in the A or B blocks, the polymers would over crosslink, have little elasticity and be unsuitable for the applications intended. The polymer may then be crosslinked through at least some of the epoxy functionality, preferably by radiation.

Some advantages of relatively low levels of epoxidation are:

- the manufacturing cost is lower because less epoxidizing agent is used;
- can maintain the polymer as an elastic material because the crosslinking will not be dense;
- the polymer will be more hydrophobic so water will be less of a problem;
- the polymer can be formulated in conventional equipment; and
- the polymer is less subject to undesirable post curing.

The epoxidized copolymers of this invention can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), and K. A. Jorgensen, *Chemical Reviews*, 89, 431 (1989), and Hermann, Fischer, and Marz, *Angew. Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of 0° to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid and to gain the maximum selectivity with respect to different levels of substitution on the olefinic double bonds, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag, or with methyltrioxorhenium/hydrogen peroxide with and without amines present. $^1$H NMR is an effective tool to determine which and how much of each type of ODB is epoxidized. Further, the amount of epoxy can also be measured by the direct titration with perchloric acid (0.1N) and quarternary ammonium halogenide (tetraethyl-ammonium bromide) where the sample is dissolved in methylene chloride. Epoxy titration is described in *Epoxy Resins Chemistry and Technology*, edited by Clayton A. May and published in 1988 (p. 1065) which is herein incorporated by reference.

An epoxidized polymer of the present invention can be further derivatized by a subsequent reaction either separately or in-situ to provide useful reactive elastomeric binders that have reactive functionality other than the epoxy group. Epoxy groups can be converted to hydroxyl functionality, capable of crosslinking with amino-formaldehyde resins or isocyanates, by reduction or reaction with water. Reaction with azide ion, reaction with cyanotrimethylsilane followed by reduction or reaction with dialkylaminosilanes, ammonia, or amines will give polymers containing both amino and hydroxyl functionality that can be used to enhance adhesion to cellulosic substrates or provide reactive sites for isocyanate cure. Reaction with amino or mercapto acids can be used to prepare polymers containing hydroxyl and carboxylic acid functionality, providing greater adhesion to metals or to basic polymers such as nylon. Reaction with mercaptosilanes can be used to prepare polymers containing the elements of coupling agents, providing excellent adhesion to glass. These functional groups may also be introduced in the form of protected functional groups by reaction of the epoxy with the appropriately functionalized organometallic reagent (lithium organocuprates, Grignard reagents). Hydroxyl and aldehyde functionality may also be introduced by hydroformulation. Reactions with acrylamides and acrylic acids will introduce sites for free radical grafting. Further neutralization of the carboxylic acid or amine-containing polymer with base or acid will give varying amounts of water dispersability, depending on the level of functionality and neutralization.

A partially hydrogenated, but not epoxidized, polymer of the present invention can be further derivatized as well. Such a polymer can be halogenated, for example, by reacting it with a solution of HBr in acetic acid, or with chlorine ($Cl_2$) or bromine ($Br_2$), either gaseous, or in solution. A wide variety of species, including alcohols, carboxylic acids and nitriles, can be added across the double bond in the presence of protic acids to form the corresponding ethers, esters and amides. Acid chlorides and anhydrides can be added across the double bond in the presence of Lewis acids. A wide variety of species containing active protons, including thiols, primary alcohols and amines, aldehydes and species of the structure $ZCH_2Z'$, where Z and Z' are electron withdrawing groups, such as $NO_2$, CN, or $CO_2H$, can be added across the double bond in the presence of radical generators, such as organic peroxides. Hydroboration can be used to prepare the alkylborane, as described in S. Ramakrishnan, E. Berluche, and T. C. Chung, *Macromolecules*, 23, 378 (1990), and subsequent papers by T. C. Chung. The alkylborane derivative may then be transformed to the alcohol, or amine, or other functional groups. Diazo compounds may be added to the double bonds, either under the influence of heat, or metal catalysts, such as Cu and Rh salts. Reactive dienophiles, such as maleic anhydride and di-t-butyl azodicarboxylate can be added to the double bond to form the anhydride or the hydrazide (which can be thermally converted to the hydrazine), respectively. Reactive dipoles, such as nitrile oxides and nittones can be added to the double bond. Hydrogenation of the above mentioned derivatives can be used t0 introduce amino—alcohol functionality. A variety of oxidative reactions, including oxidation with potassium permanganate and sodium perborate, may be used to introduce hydroxyl groups.

The polymers of this invention are preferably cured (crosslinked}by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used. The details of radiation curing are given in commonly assigned copending applications Ser. No. 692,839, filed Apr. 28, 1991, "Viscous Conjugated Diene Block Copolymers" and Ser. No. 772, 172, filed Oct. 7, 1991, "Crosslinked Epoxy Functionalized Block Polymers and Adhesives," both of which are herein incorporated by reference.

Reactive (curable) diluents that can be added to the polymer include epoxy, vinyl ether, alcohol, acrylate and methacrylate monomers and oligomers. Such polymers and other diene-based polymers may also be added or blended. Examples of epoxy reactive diluents include bis(2,3-epoxycyclopentyl)ether (Union Carbide EP-205), vinyl cyclohexene dioxide, limonene oxide, limonene dioxide, pinene oxide, epoxidized fatty acids and oils like epoxidized soy and linseed oils.

The polymers may also be cured without the use of radiation by addition of a cationic initiator. Suitable initiators include the halides of tin, aluminum, zinc, boron, silicon, iron, titanium, magnesium and antimony, and the fluoroborates of many of these metals. BF complexes such as BF-ether and BF-amine are included. Also useful are strong Bronsted acids such as trifluoromethanesulfonic (triflic acid) and the salts of triflic acid such as FC-520 (3M Company). The cationic initiator is chosen to be compatible with the polymer being crosslinked, the method of application and cure temperature. The epoxy-containing polymers may also be crosslinked by the addition of multifunctional carboxylic acids, acid anhydrides, and alcohols, and in general by the curing methods described in U.S. Pat. No. 3,970,608, which is incorporated by reference. Volatile amines can be used to inhibit or retard unwanted cure, such as to maintain fluidity in one pack formulations until they are applied and reach the appropriate bake temperature for cure. Radiation crosslinking is preferred because reactive ingredients do not come in contact with warm adhesives.

The crosslinked materials of the present invention are useful in adhesives (including pressure sensitive adhesives, contact adhesives, laminating adhesives and assembly adhesives), sealants, coatings, films (such as those requiring heat and solvent resistance), printing plates, fibers, and as modifiers for polyesters, polyethers and polyamides. The polymers are also useful in asphalt modification. In addition to the functionalized polymer and any curing aids or agents, products formulated to meet performance requirements for particular applications may include various combinations of ingredients including adhesion promoting or tackifying resins, plasticizers, fillers, solvents, stabilizers, etc. as descrivbed in detail in the aforementioned commonly assigned applications which are incorporated by reference.

Compositions of the present invention are typically prepared by blending the components at an elevated temperature, preferably between 50° C. and 200° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

Adhesive compositions of the present invention may be utilized as many different kinds of adhesives' for example, laminating adhesives, flexible packaging laminating adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be hot melt application at a temperature around or above 100° C. because hot melt application above 100° C. minimizes the presence of water and other low molecular weight inhibitors of cationic polymerization. The adhesive can be heated before and after cure to further promote cure or post cure. Radiation .cUr.e of hot adhesive is believed to promote faster cure than radiation cure at room temperature.

Preferred uses of the present formulation are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

Example 1

Polymer 1 was a symmetric star polymer $(A\text{-}B\text{-}M_o)_{17}\text{-}X\text{-}C_o$ having polyisoprene A blocks and polybutadiene B blocks. It was prepared by anionic polymerization using two reactors. The polyisoprene block was completely polymerized in cyclohexane using sec-butyl lithium initiator in the first reactor, then the polyisoprene solution was transferred to the second reactor which contained additional cyclohexane and diethyl ether cosolvent and part of the butadiene monomer; additional butadiene monomer was added until the complete diblock polymer arm polymerization was complete. DVB-55 was added to couple the arms and after about an hour reaction time, methanol was added to terminate the living polymer. The diethyl ether cosolvent was incorporated to cause increased 1,2-polymerization of the butadiene. The amounts of monomer used were 29.82 pounds of 1,3-isoprene, 170.18 pounds of 1,3-butadiene and 17.19 pounds of commercial divinylbenzene mixture (DVB-55 from Dow). According to GPC analysis on the final polymer, about 83% of the arms were coupled by the DVB with 17% left unattached. The peak molecular weight of the polyisoprene-polybutadiene arms (A-B arms) prior to coupling with the DVB was about 5780. Therefore, the molecular weights of the A and B blocks were about 910 and 4870, respectively, and the molecular weight of that portion of the polyDVB associated with each of these arms was about 490, for a total of about 6270. The weight average molecular weight, $M_w$, of the polymer was measured by static light scattering. Dry polymer was dissolved in tetrahydrofuran and filtered through a 0.5 and a 0.2 micron filter. The analysis wavelength was 632.8 mn, the temperature was 25.0° C. and the DRI was 0.146. The $M_w$ determined was 105,000. Dividing this $M_w$ by 6270 indicates that the star polymer had an average of about 17 diblock arms. Hence, for every mole of active initiator (sec-butyl lithium), about 13 moles of 1,3-isoprene, 90 moles of 1,3-butadiene and 3.8 moles of commercial divinylbenzene mixtures (DVB-55 from Dow) were polymerized; and n=17. The weight percent composition for the polymer is shown.

| Polymer 1 composition | |
|---|---|
| | weight % |
| sec-butyl group | 0.9 |
| polyisoprene | 13.6 |
| polybutadiene | 77.7 |
| DBV-55 mixture | 7.8 |

$^1$H NMR analysis on the polymer indicated that the polyisoprene A blocks contained about 11% of their isoprene units in the 3,4-configuration (1,1-disubstituted ODB's) and about 89% in the 1,4-configuration (1,1,2-trisubstituted ODB's), and that the internal polybutadiene B blocks contained about 40% of their butadiene units in the 1,2-configuration (monosubstituted ODB's) and about 60% in the 1,4-configuration (1,2-disubstituted ODB's). The corresponding concentrations of mono-, di-, and trisubstituted olefinic double bonds in each block are shown below.

| | Milliequivalents of olefinic double bonds per gram of each block | |
|---|---|---|
| Type | Block A | Block B |
| monosubstituted ODB's | 0 | 7.3 |
| disubstituted ODB's | 1.5 | 11.2 |
| trisubstituted ODB's | 12.3 | 0 |

Example 2

Polymer 2: A portion of polymer 1 solution was epoxidized at 20° C. in a stirred reactor flask using a solution of peracetic acid according to the recipe below.

| Epoxidation recipe: | |
|---|---|
| polymer 1, g of solution (polymer = 564 g, solvent mixture = 1942 g) | 2506 |
| sodium carbonate, g | 4.50 |
| peracetic acid solution, g | 208 |

Peracetic acid (from FMC Corp.) typically consists of 35% peracetic acid, 39% acetic acid, 5% hydrogen peroxide, 1% sulfuric acid and 20% water, all by weight. The peracetic acid addition time was 35 minutes; a 2 hour hold time followed. The 4.5 g of sodium carbonate was added in two steps, half before the peracetic acid addition and the other 2.25 g halfway into the peracetic acid addition. Sufficient sodium carbonate (122 g) to completely neutralize the peracetic acid solution was dissolved in distilled water to give 6000 g of wash solution. This sodium carbonate wash solution was added to another flask and the epoxidized polymer solution was added to it while stirring. The mixture was stirred for 30 minutes, agitation was stopped and the bottom water/sodium acetate layer was removed. The polymer solution was washed three additional times with distilled water (3500 g each time). The final wash water removed from the polymer solution had a pH of 5.9 and an electrical conductivity of 50 micromohs/cm. The polymer was recovered by drying.

$^1$H NMR analysis on the polymer before and after epoxidation gave the following breakdown of the olefinic double bonds concentrations in the polymers, the net change in the quantity of each type of ODB and amount of epoxide formed in the final polymer. The generation of 1.71 Meq/g of epoxide causes a 2.74% weight increase (1.71*0.016*100%) from polymer 1 to polymer 2.

| | $^1$H NMR Results, Meq/g Polymer | | | |
|---|---|---|---|---|
| Source | Polymer 1 | Polymer 2 | Polymer 2 Values*1.027 | Change P1–P2*1.027 |
| 1,4-polyisoprene | 2.25 | 1.06 | 1.09 | 1.16 |
| 3,4-polyisoprene | 0.29 | 0.25 | 0.26 | 0.03 |
| 1,4-polybutadiene | 8.91 | 8.13 | 8.35 | 0.56 |
| 1,2-polybutadiene | 5.82 | 5.66 | 5.82 | 0.00 |
| epoxide | 0.00 | 1.71 | 1.76 | Total = 1.75 |

The last column, above, shows the net change in each particular type of olefinic double bond and its the basis for determining how much and what kind of epoxides are present in the A and B blocks of polymer 2. The Meq/g values in the last column indicate that 68% of the epoxidation occurred in the polyisoprene A blocks and that 32% occurred in the polybutadiene B blocks. Hence, the A blocks increased in molecular weight from 910 to 1030 and have 7.3 Meq of di- and trisubstituted epoxide per gram of block, while the B blocks increased in molecular weight from 4870 to 4920 and have 0.72 Meq of disubstituted epoxide per gram of block B. The A:B ratio of epoxide is 10:1.

Although the polymer 2 is not an example of the present invention because the molecular weights of the A and B blocks are small, the polymers and procedures of Examples 1 and 2 clearly show how polymers of the present invention can be prepared. All that would need be done is to reduce the amount sec-butyl lithium initiator used in the preparation of polymer 1 to about one-fourth or less of the level that was used, as this would cause the A and B molecular weights to fall above 3000 and 15,000 respectively.

Example 3

Polymer 3 was a symmetric star polymer $(A\text{-}B\text{-}M_1)_{17}\text{-}X\text{-}C_o$ having polyisoprene A and M blocks and polybutadiene B blocks. It was prepared by anionic polymerization in cyclohexane. For every mole of active initiator (sec-butyl lithium), about 75 moles of 1,3-isoprene, 519 moles of 1,3=butadiene, 10 moles of 1,3-isoprene and 6 moles of commercial divinylbenzene mixture (DVB-55 from Dow) were polymerized successively. A small amount of diethyl glyme was added to the polymer solution just before the addition of the butadiene monomer for the purpose of polymerizing the butadiene to a high 1,2-configuration. The polymer was terminated with methanol. The molar ratios correspond to the given % by weight composition for the polymer. The peak molecular weight of the polyisoprene-polybutadiene-oligoisoprene arms, A-B-M arms, prior to coupling with the DVB, as measured by GPC, was about 33,000. The molecular weights of the A, B and M blocks were about 5,000, 28,000 and 700, respectively. About 84% of the arms were coupled. Based on composition, the A and the M blocks had about 14.7 Meq/g of residual ODB's most of which were trisubstituted, while the B blocks had 18.5 Meq/g of double bonds, none of which were trisubstituted. $^1$H NMR analysis on the A-B and A-B-M segments prior to DVB coupling indicated that the external polyisoprene blocks, A, contained about 10% of their isoprene mers in the 3,4 configuration and about 90% in the 1,4 configuration, the internal polybutadiene blocks, B, contained about 81% of their butadiene mers in the 1,2 configuration and about 19% in the 1,4 configuration, and the polyisoprene miniblocks, M, had about 36% of their mers in the 3,4 configuration and about 64% in the 1,4 configuration. The concentrations of tri-, di- and monosubstituted olefinic double bonds in each block are summarized below.

| Polymer 3 composition | weight % |
|---|---|
| polyisoprene | 14.7 |
| polybutadiene | 81.0 |
| polyisoprene | 2.0 |
| DVB mixture | 2.3 |

| | Milliequivalents of olefinic double bonds per gram of each block | | |
|---|---|---|---|
| Type | Block A | Block M | Block B |
| trisubstituted ODB | 13.2 | 9.4 | 0 |
| disubstituted ODB | 1.5 | 5.3 | 3.5 |
| monosubstituted ODB | 0 | 0 | 15.0 |

Example 4

Polymer 4: Polymer 3 was partially hydrogenated using a nickel-aluminum catalyst under conditions that do not hydrogenate aromatic double bonds and will preferentially hydrogenate olefinic double bonds that are not TU sites. The catalyst was washed out. The hydrogenation catalyst was made by the reaction of nickel 2-ethylhexanoate and triethylaluminum (AL/Ni ratio was about 2.3/1) and was used at 13 ppm nickel ($18\times10^{-3}$ mmoles Ni/g polymer) on a solution basis, at a pressure of 500 psi and a temperature of about 70° C. The $M_w$ was 585,000 as determined by static light scattering. The DRI was 0.096.

$^1$H NMR analysis provided the following approximate composition of the residual olefinic double bonds (ODB) in Polymer 4, as given below. Using these results, the ODB concentration in the A+M and the B blocks can be calculated. These values are also shown below. It is reasonable to assume that under the hydrogenation conditions both blocks A and M hydrogenated about the same. Therefore it can be concluded that the total di- and trisubstituted ODB concentration reported for A+M is approximately the same as that of the A blocks and of the M blocks individually. In any event, the concentration range for the A blocks cannot be more than about 2.9 to about 4.8 Meq/g, even if none or all of the isoprene mers in block M were hydrogenated, respectively. The ratio of unsaturation in the A blocks to that in the B blocks was 5.5:1. Polymer 4 is an example of this invention.

| $^1$H NMR results (Polymer 4) | Meq/g polymer |
|---|---|
| 1,4 polyisoprene (trisubstituted ODB) | 0.63 |
| 3,4 polyisoprene (disubstituted ODB) | 0.08 |
| 1,4 polyisoprene (disubstituted ODB) | 0.62 |
| 1,2 polyisoprene (monosubstituted ODB) | 0.06 |
| Total | 1.39 |

| | Milliequivalents per gram of block | | |
|---|---|---|---|
| Type | Block A + M | Block B | |
| trisubstituted | 3.77 | 0 | |
| disubstituted | 0.48 | 0.77 | |
| monosubstituted | 0 | 0.07 | |
| Total (di & tri-) | 4.25 | 0.77 | A/B ratio = 5.5 |

Example 5

Polymer 5: Polymer 4 was epoxidized at 45° C. using a solution of peracetic acid from FMC Corp. according to the recipe below, using a stirred reactor flask, a 60 minute peracetic acid addition time and a 6 hour hold. The sodium carbonate was added in two steps. After the 6 hour hold, sufficient sodium carbonate was added to neutralize all the acetic and any residual peracetic acid in the reaction flask, the polymer solution was thoroughly washed with water and the solvent was separated from the polymer by drying.

| Epoxidation | |
|---|---|
| polymer, g | 275 |
| solvent (mostly cyclohexane), g | 1762 |
| sodium carbonate, g | 4.07 |
| peracetic acid solution, g | 188 |

$^1$H NMR analysis on the polymer gave the following approximate break-down of residual olefinic double bonds left and the approximate amount of epoxide formed in the polymer.

| $^1$H NMR results | Meq/g polymer 5 |
|---|---|
| 1,4 polyisoprene (trisubstituted ODB) | 0.03 |
| 3,4 polyisoprene (disubstituted ODB) | 0.01 |
| 1,4 polyisoprene (disubstituted ODB) | 0.02 |
| 1,2 polyisoprene (monosubstituted ODB) | 0.04 |
| Total ODB | 0.10 |
| epoxy group | 1.23 |
| Total ODB + epoxide | 1.33 |

The addition of 1.23 Meq epoxide/g polymer causes a 2% weight gain. The titrated value found for the amount of epoxide in Polymer 5 was about 1.01 Meq/g.

The effect of the epoxidation of Polymer 4 was to epoxidize about 94% of the total di- and trisubstituted ODB on the polyisoprene blocks, A and M, and about 97% of disubstituted ODB on the polybutadiene blocks, B, and create epoxidized Polymer 5. Hence, for Polymer 5, the A and M blocks each have about 4.0 Meq epoxide/g, and B blocks have about 0.75 Meq epoxide/g. The ratio of epoxide in the A:B blocks was about 5.3:1. Polymer 5 is an example of the invention.

Example 6

Polymer 5 was used to make formulations A, B, C, and D. Formulation A is just neat polymer with a small amount of antioxidant added while formulation B included 25% of the tackifying resin Escorez® 5380 (Exxon). These formulations were intended for EB curing. Formulations C and D are similar to A and B respectively, except that 1% UVI-6974 photoinitiator (Union Carbide) was added to facilitate UV cure. UVI-6974 absorbs UV light from 188 to about 350 nm.

| Formulation | A | B | C | D |
|---|---|---|---|---|
| Polymer 5 | 99.7 | 74.8 | 98.7 | 74.0 |
| Excorez ® 5380 | 0.0 | 24.9 | 0.0 | 24.7 |
| UVI-6974 | 0.0 | 0.0 | 1.0 | 1.0 |
| Irganox ® 1010 | 0.3 | 0.3 | 0.3 | 0.3 |

Formulations A and B were dissolved in toluene and cast onto sheets of 1 mil Mylar to give about 3 mil layers of dry formulation after solvent evaporation. Formulations C and D were dissolved in a 75/25 weight % mixture of toluene/n-butanol and similarly cast. Immediately before irradiating the film samples, the samples were preheated in an oven for 2 minutes at 149° C. to remove any moisture and simulate having just been hot melt coated. EB irradiation was done on an ESI CB-150 processor using 165 Kev electrons. UV irradiation was done on a Linde PS-2000 Laboratory Photocure unit having a single medium pressure Hg bulb delivering UV radiation from 188 nm to 365 nm, aluminum reflectors and a variable speed carrier belt. UV dose was controlled by varying the conveyor speed, which has a 60 fpm maximum and by inserting a filter. The filter prevents UV irradiation below about 300 nm from reaching the test product. This reduces the incidence of UV energy that overlaps the absorbance spectrum of the UVI-6974 photoinitiator by a factor of about 4. For both EB and UV curing, a nitrogen blanket was used to suppress ozone formation and its. consequent discharge into the working environment. Curing involves a cationic mechanism which is known not to be inhibited by oxygen. The formulations were tested for polymer gel content (solvent resistance) and other properties of a high performance PSA adhesive. The results are given in Table 1.

The results in Table 1 show that Polymer 5 can be cured to high gel contents at low doses of EB or UV irradiation. In formulations A and B, the polymer was cured to over 80% gel with just 1 Mrad of EB irradiation. In formulations C and D, the polymer was fully cured with a single pass under the unfiltered UV bulb at 20, 40, and 60 fpm, which was the maximum speed available on the UV processing unit. Even when using the filter to prevent UV light with a wavelength less than about 300 nm from reaching the test specimen, formulation C was fully cured at 20 fpm and formulation D was fully cured at 40 fpm. PSA testing of formulations C and D show that without curing the formulations lack sufficient cohesive strength to be useful as pressure sensitive adhesives. However, PSA testing of the UV cured samples shows that formulation C (the polymer) or, better yet, formulation D (the tackifying resin containing polymer) are excellent adhesives having sufficient cohesive strength to allow good tack properties (rolling ball tack and Polyken probe tack), and clean peeling (180° C. peel from steel) and provide high temperature shear resistance (95° C. holding power to Mylar).

TABLE 1

| Electron Beam Cure % Polymer Gel Content | | |
|---|---|---|
| Formulation dose, Mrads | A | B |
| 0 | 0 | 0 |
| 1 | 85 | 81 |
| 2 | 88 | 86 |

| Formulation: | Polymer Gel Content (%) | | 95° C. Holding* Power to Mylar (minutes) | | Rolling Ball Tack (cm) | | Polyken Probe Tack (Kg) | | 180° Peel from steel (pli)** | |
|---|---|---|---|---|---|---|---|---|---|---|
| line speed, fmp[1] | C | D | C | D | C | D | C | D | C | D |
| UV Cure - no filter | | | | | | | | | | |
| no cure | 0 | 0 | 0 | 0 | cohesive failure | | | | 1.7 | 2.7 |
| | | | cohesive failure | | | | | | cohesive failure | |
| 60 | 95 | 100 | >1000 | >1000 | 3 | 3 | .8 | .9 | 1.2 | 2.5 |
| 40 | 97 | 100 | >1000 | >1000 | 3 | 4 | .6 | .8 | 1.2 | 2.3 |
| 20 | 99 | 100 | >1000 | >1000 | 2 | 3 | .6 | 1.2 | 1.0 | 2.1 |
| UV Cure With Use of a Filter | | | | | | | | | | |
| 60 | 86 | 95 | >1000 | 500 | 1 | 4 | .8 | 1.2 | 2.6c | 4.0c |
| 40 | 92 | 94 | >1000 | >1000 | 2 | 3 | .6 | .9 | 1.3c | 2.7 |
| 20 | 98 | 98 | >1000 | >1000 | 3 | 2 | .6 | 1.0 | 0.9 | 2.1 |

*1 square inch overlap with 1 Kg mass.
**pli = pounds per linear inch
c = slight cohesive failure.

I claim:

1. A process for the production of a partially hydrogenated conjugated diene block copolymer of the formula $D_n$-X-$C_r$ wherein D is A-B-$M_p$ or $(A\text{-}B)_j$-$M_p$ or A-$(B\text{-}A)_j$-$M_p$; and wherein A is a diene block which has a molecular weight of 3,000 to 50,000; and wherein B is a diene block which has a molecular weight of from 15,000 to 200,000; and wherein C is a block or multiblock segment which has a molecular weight of from 100 to 200,000 and comprises A, B or methacrylate or mixtures thereof but is not identical to D; and wherein the B block may comprise up to 50% of a monoalkenyl aromatic hydrocarbon monomer and the A blocks may comprise up to 99% of a monoalkenyl aromatic hydrocarbon monomer; and wherein M is a miniblock of a monomer selected from the group consisting of vinyl aromatic hydrocarbons and dienes and which has a molecular weight of 50 to 3000; and wherein the A blocks contain a greater concentration of di-, tri-, or tetrasubstituted olefinic epoxides than the B blocks; and wherein X is a coupling agent or coupling monomers or initiator, j is 1 to 6, $n \geqq 2$, $r \geqq 0$, $n \geqq r$, n+ r ranges from 3 to 100 and p is 0 or 1;

said process comprising polymerizing the diene which makes up block A under anionic polymerization conditions to form block A, adding the diene which makes up block B to the reaction mixture and polymerizing it to form block B at one end of block A, subsequently coupling AB diblocks together by adding X to the reaction mixture to form a coupled block copolymer, and partially hydrogenatinq the coupled block copolymer such that the ratio of olefinic double bonds in the A blocks to that in the B blocks is at least 3:1.

2. A process for the production of a partially hydrogenated conjugated diolefin block copolymer of the formula $(A\text{-}B)_k$ or A-$(B\text{-}A)_j$ wherein A is a diene block which has a molecular weight of 3000 to 50,000; and wherein B is a diene block which has a molecular weight of from 15,000 to 200,000; and wherein the A blocks contain a greater concentration of di-, tri-, or tetrasubstituted olefinic epoxides than the B blocks; and wherein j is 1 to 6 and k is 2 to 6; and said process comprising polymerizing the diene which makes up block A under anionic polymerization conditions to form block A, adding the diene which makes up block B to the reaction mixture and polymerizing it under anionic polymerization conditions to form block B at one end of block A, optionally, repeating the sequential addition of said dienes and anionic polymerization of them to form additional blocks to provide the block copolymer, and partially hydrogenating the block copolymer such that the ratio of olefinic double bonds in the A blocks to that in the B blocks is at least 3:1.

* * * * *